US011889000B2

(12) United States Patent
Sampath et al.

(10) Patent No.: US 11,889,000 B2
(45) Date of Patent: Jan. 30, 2024

(54) SHARED DEVICE SECURE ACCESS

(71) Applicant: CITRIX SYSTEMS, INC., Fort Lauderdale, FL (US)

(72) Inventors: Santosh Gummunur Chiranjeevi Sampath, Bangalore (IN); Manbinder Pal Singh, Fort Lauderdale, FL (US)

( * ) Notice: Subject to any disclaimer, the term of this patent is extended or adjusted under 35 U.S.C. 154(b) by 180 days.

(21) Appl. No.: 17/650,099

(22) Filed: Feb. 7, 2022

(65) Prior Publication Data
US 2023/0254164 A1    Aug. 10, 2023

(51) Int. Cl.
*H04L 9/32* (2006.01)
*G06F 21/35* (2013.01)
*G06F 21/36* (2013.01)

(52) U.S. Cl.
CPC ............ *H04L 9/3271* (2013.01); *G06F 21/35* (2013.01); *G06F 21/36* (2013.01); *H04L 9/3213* (2013.01); *H04L 9/3228* (2013.01)

(58) Field of Classification Search
CPC ... H04L 9/3271; H04L 9/3213; H04L 9/3228; G06F 21/35; G06F 21/36
See application file for complete search history.

(56) References Cited

U.S. PATENT DOCUMENTS

| 8,255,984 B1 * | 8/2012 | Ghostine | H04L 63/1491 713/168 |
| 2020/0374121 A1 * | 11/2020 | Momchilov | H04L 9/0825 |

* cited by examiner

*Primary Examiner* — Izunna Okeke

(57) ABSTRACT

A method includes operating a mobile device to establish a communications channel between the mobile device and a shared computing terminal. The shared computing terminal is accessible to a plurality of users other than a user of the mobile device. In response to authentication of the user of the mobile device with a remote computing device, the mobile device receives a code from the remote computing device. The mobile device provides the code to the shared computing terminal via the communications channel to enable the shared computing terminal to request a temporary access token from the remote computing device. The temporary access token is used by the shared computing terminal to launch a computing session with the remote computing device without transfer of a long-lived access token of the user from the mobile device to the shared computing terminal.

16 Claims, 10 Drawing Sheets

SHARED DEVICE SECURE ACCESS

TECHNICAL FIELD

The present disclosure relates to computing systems, and more particularly, to accessing resources on a shared device.

BACKGROUND

Many organizations are now using application and/or desktop virtualization to provide a more flexible option to address the varying needs of their users. In desktop virtualization, a user's operating system, applications, and/or user settings may be separated from the user's physical smartphone, laptop, or desktop computer.

Using client-server technology, a virtualized desktop may be stored in and administered by a remote server, rather than in the local storage of a computing device. The computing device accesses the virtualized desktop in a remote computing session with the server. The remote computing session allows a user to access resources. The resources, for example, include SaaS and web apps, desktops, files and data. At times, the user of the computing device may access their resources on a shared device that is accessible to other users.

SUMMARY

A method includes operating a mobile device to establish a communications channel between the mobile device and a shared computing terminal, with the shared computing terminal being accessible to a plurality of users other than a user of the mobile device. In response to authentication of the user of the mobile device with a remote computing device, a code is received from the remote computing device. The code is provided to the shared computing terminal via the communications channel to enable the shared computing terminal to request a temporary access token from the remote computing device. The temporary access token is used by the shared computing terminal to launch a computing session with the remote computing device without transfer of a long-lived access token of the user from the mobile device to the shared computing terminal.

The method may further includes operating the mobile device, after establishing the communications channel, to provide a request to the remote computing device for the temporary access token.

In response to the request for the temporary access token, the method may further include operating the mobile device to receive a challenge from the remote computing device, and provide a response to the challenge along with the long-lived access token to the remote computing device. The response and the long-lived access token are used by the remote computing device to authenticate the user of the mobile device.

Providing the code to the shared computing terminal may further include providing an address of the remote computing device, with the remote computing device providing the temporary access token to the shared computing terminal in response to verification of the code provide by the shared computing terminal.

The long-lived access token allows the mobile device to access workspace resources via the remote computing device, and wherein the temporary access token allows the shared computing terminal to access the same workspace resources.

The code and the temporary access token may be configured to expire after a set time period. Alternatively, the code and the temporary access token may be effective for a single computing session.

The method may further include operating the mobile device to log into the remote computing device based on an initial authentication of the user with the remote computing device, and receive the long-lived access token in response to the initial authentication.

The initial authentication of the user at login may be separate from the authentication of the user to receive the code.

The long-lived access token allows the user of the mobile device to later log back into the remote computing device without requiring authentication.

The communications channel is established based on the mobile device pairing with the shared computing terminal. The pairing may be based on the mobile device reading a QR code provided by the shared computing terminal, with the QR code providing pairing information. Alternatively, the pairing may be based on the mobile device using near field communications (NFC) to exchange the pairing information with the shared computing terminal.

Another aspect is directed to a mobile device implementing the method as described above. The mobile device includes a memory and a processor configured to cooperate with the memory. The processor is configured to establish a communications channel between the mobile device and a shared computing terminal, with the shared computing terminal being accessible to a plurality of users other than a user of the mobile device. In response to authentication of the user of the mobile device with a remote computing device, a code is received by the processor from the remote computing device. The code is provided to the shared computing terminal via the communications channel to enable the shared computing terminal to request a temporary access token from the remote computing device. The temporary access token is used by the shared computing terminal to launch a computing session with the remote computing device without transfer of a long-lived access token of the user from the mobile device to the shared computing terminal.

Yet another aspect is directed to a non-transitory computer readable medium for a mobile device, and with the non-transitory computer readable medium having a plurality of computer executable instructions for causing the mobile device to perform steps as described above.

DETAILED DESCRIPTION

Figure 1:
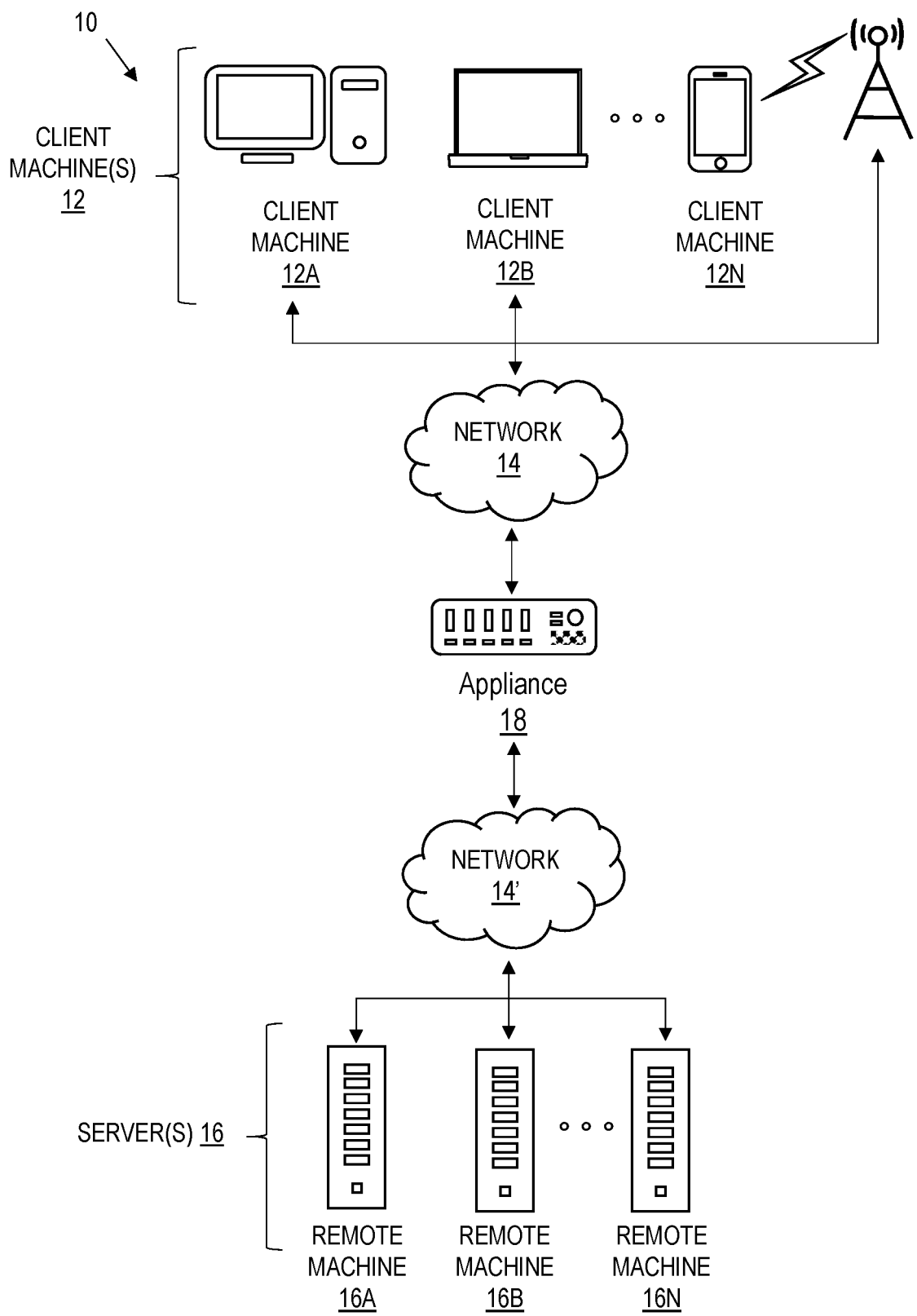
FIG. 1 is a schematic block diagram of a network environment of computing devices in which various aspects of the disclosure may be implemented.

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

A mobile device may be used to access a session (e.g., a remote computing session) hosted on a remote computing device. The mobile device allows the user to remain connected to their session while roaming within an organization. At times, the user of the mobile device may want to share content (e.g., screen cast or mirror screen content) from the mobile device to a shared computing terminal. However, the shared computing terminal is accessible to a plurality of users other than a user of the mobile device, which makes storage of data on the terminal insecure or otherwise unsafe.

A shared computing terminal may be placed in a common area within an organization. The shared computing terminal typically provides a larger display area for viewing the content that is being screen cast or mirrored. The common area may be a conference room, for example, where the user of the mobile device wants to share content from their mobile device to the larger display area of the shared computing terminal for viewing by others within the conference room. As another example, the organization may be a hospital, and the shared computing terminal is to be used by doctors to access patient files. The larger display area of the shared computing terminal allows the doctor to view the patent files on a larger display area as compared to viewing them on their mobile device.

Since the mobile device remains connected to the remote computing session throughout the day, the mobile device may be misused when in proximity to a shared computing terminal. For example, the user of the mobile device may walk away from their desk while leaving behind the mobile device. Another colleague within the organization may then pick up the mobile device and go to a shared computing terminal and access the user's remote computing session.

The session allows the user of the mobile device to access all features and capabilities of the resources that are available via the session since the mobile device is logged into or otherwise has all the necessary access tokens to access the remote computing device providing the resources. However, when the user of the mobile device is screen casting or mirroring to the shared computing terminal, the shared computing terminal is not logged into or otherwise has access to the remote computing device. Instead, the shared computing terminal is accessing the remote desktop provided by the mobile device, and which provides a reduced number of features and capabilities of the resources that would otherwise be available if the shared computing terminal were logged into the remote computing device. For example, an embedded browser that is available to the mobile device is not available in the remote desktop provided to the shared computing terminal by the mobile device to access SaaS and web apps. Other examples include action workflows using microapps and access to feeds not being available in the remote desktop provided to the shared computing terminal by the mobile device.

An alternative to screen casting and mirroring is for the mobile device to pass Independent Computing Architecture (ICA) files to the shared computing terminal. ICA is a protocol designed for transmitting Windows graphical display data as well as user input over a network. The ICA files may be used to authorize the shared computing terminal to access the remote computing session. However, the ICA files also do not allow the user to access all features and capabilities of the resources since the ICA files do not include access tokens for all of the resources.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'. In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 18 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
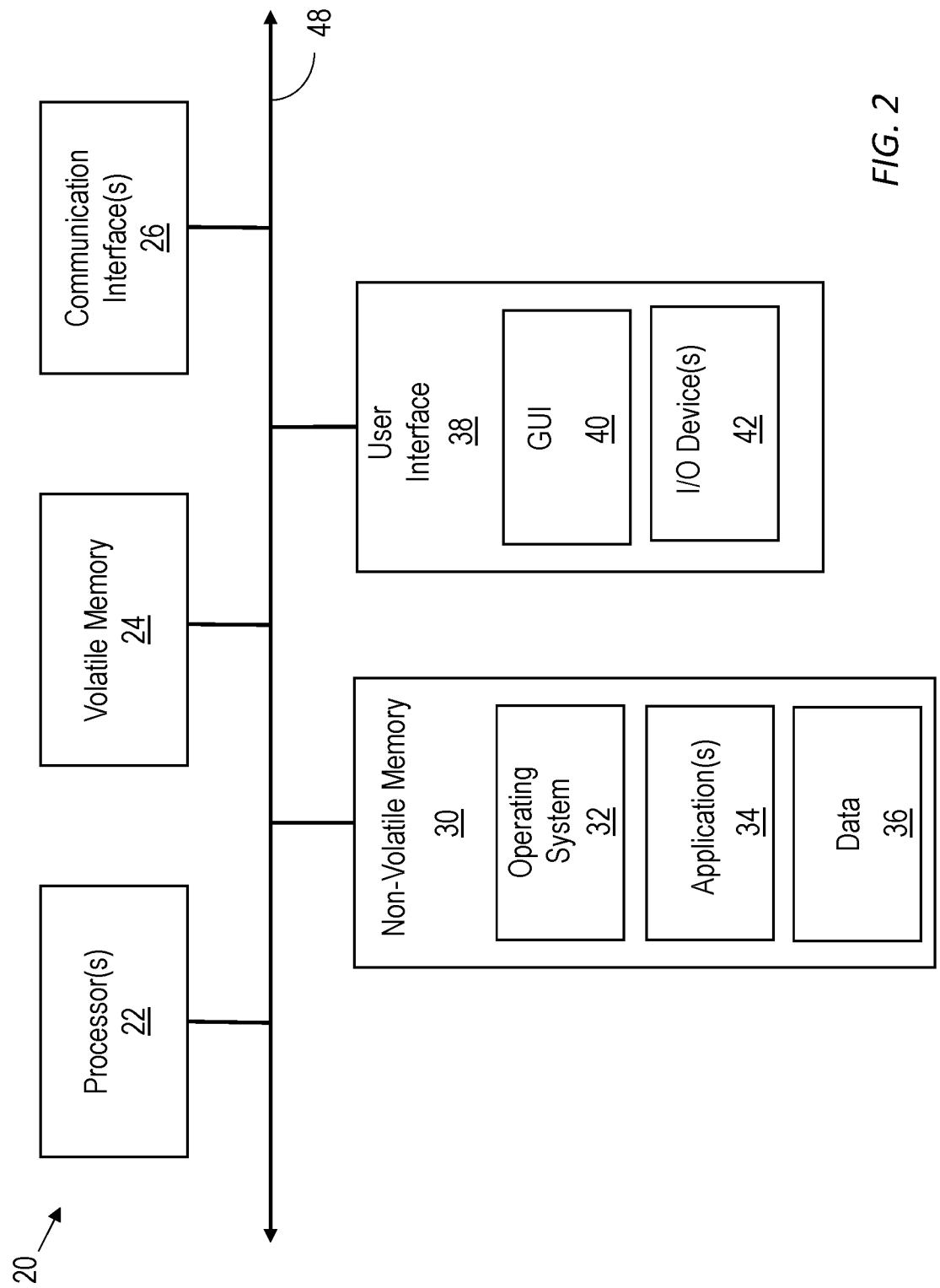
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
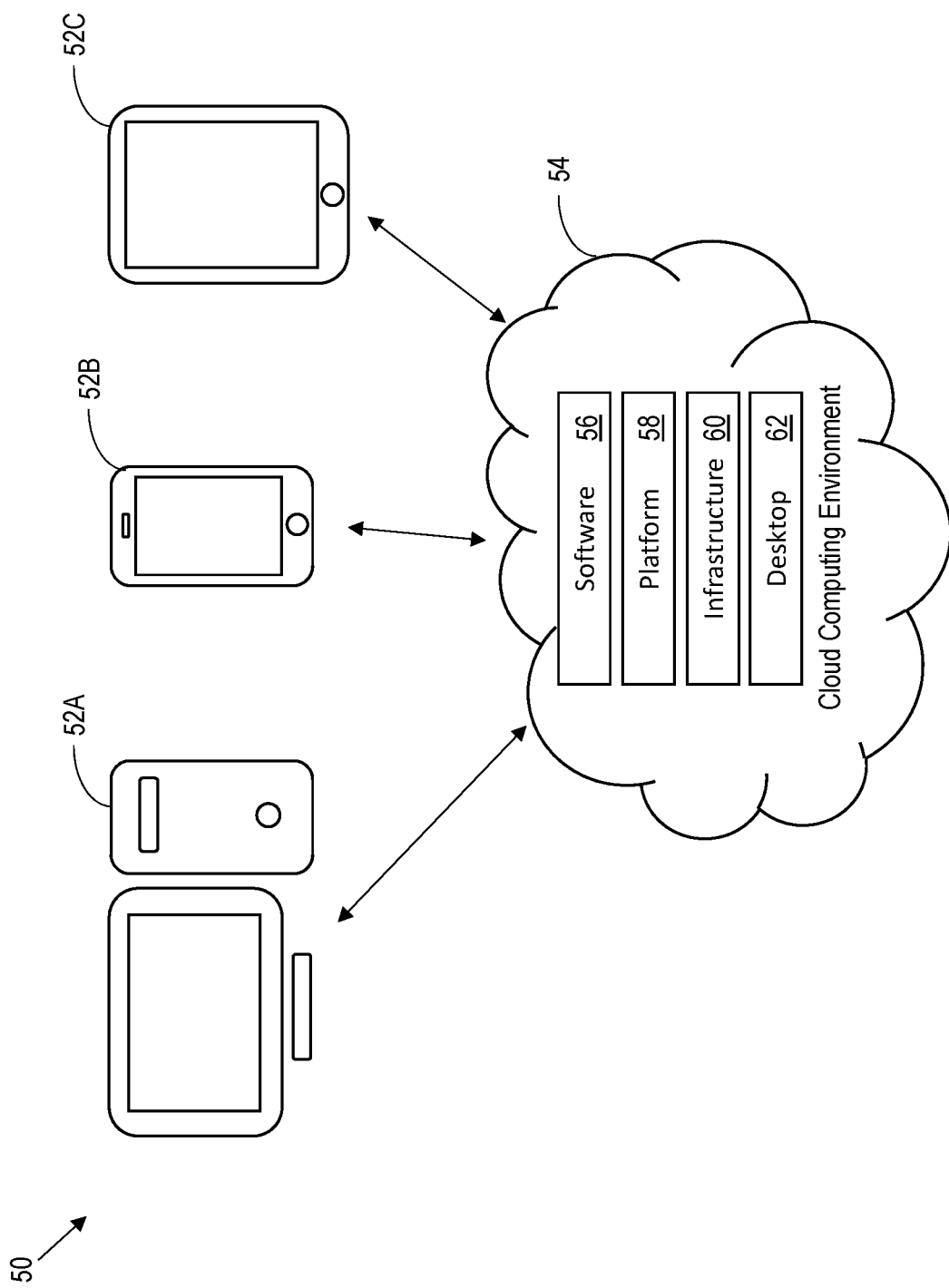
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft ONEDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
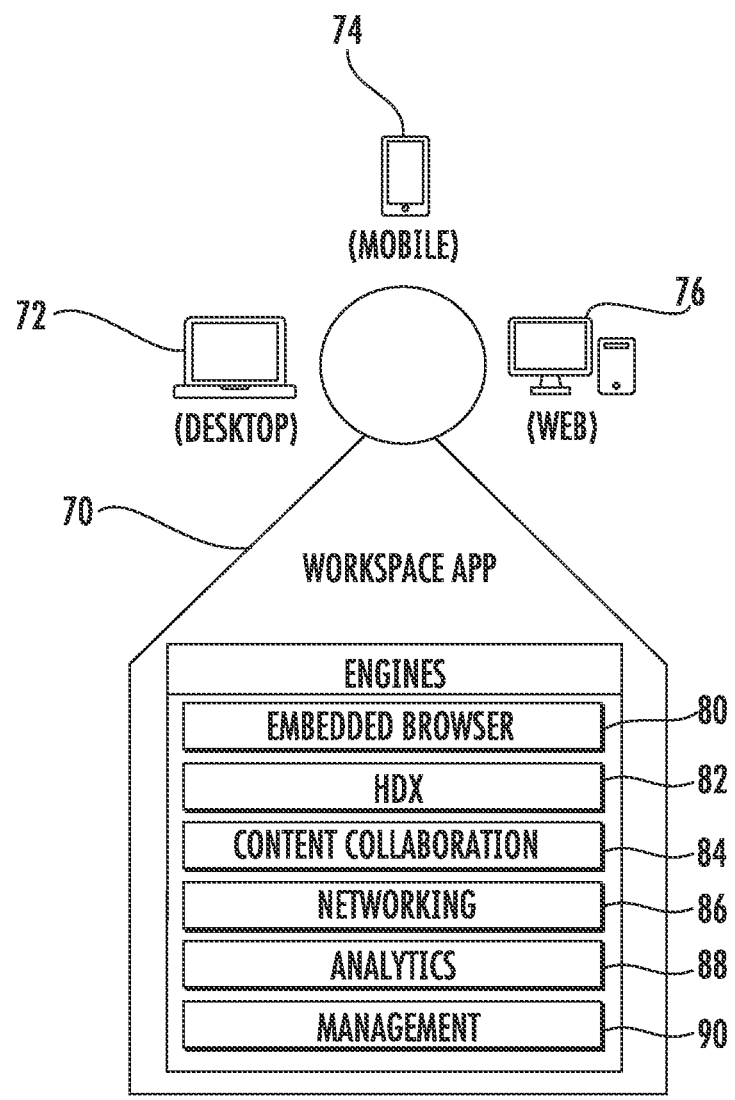
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
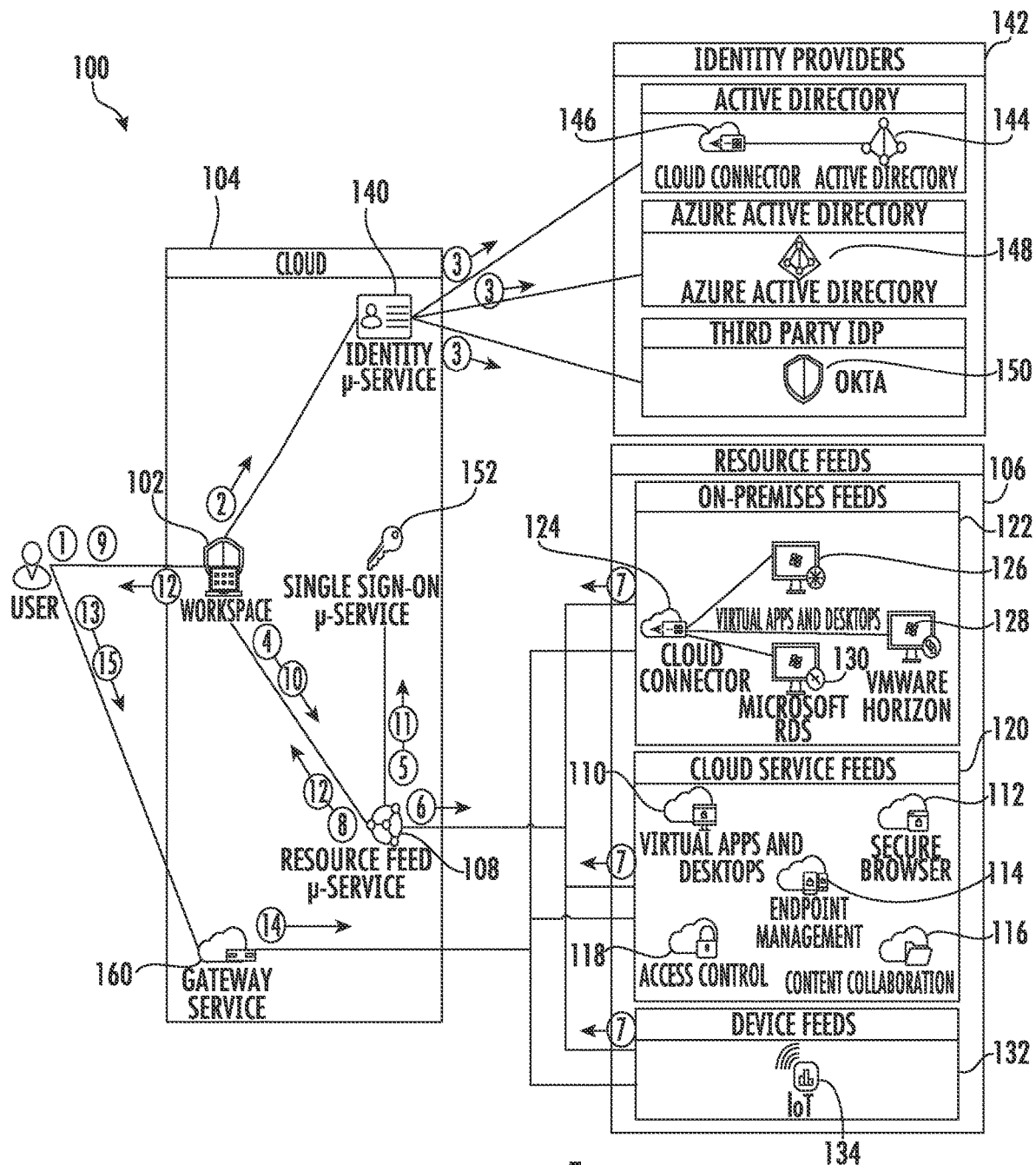
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
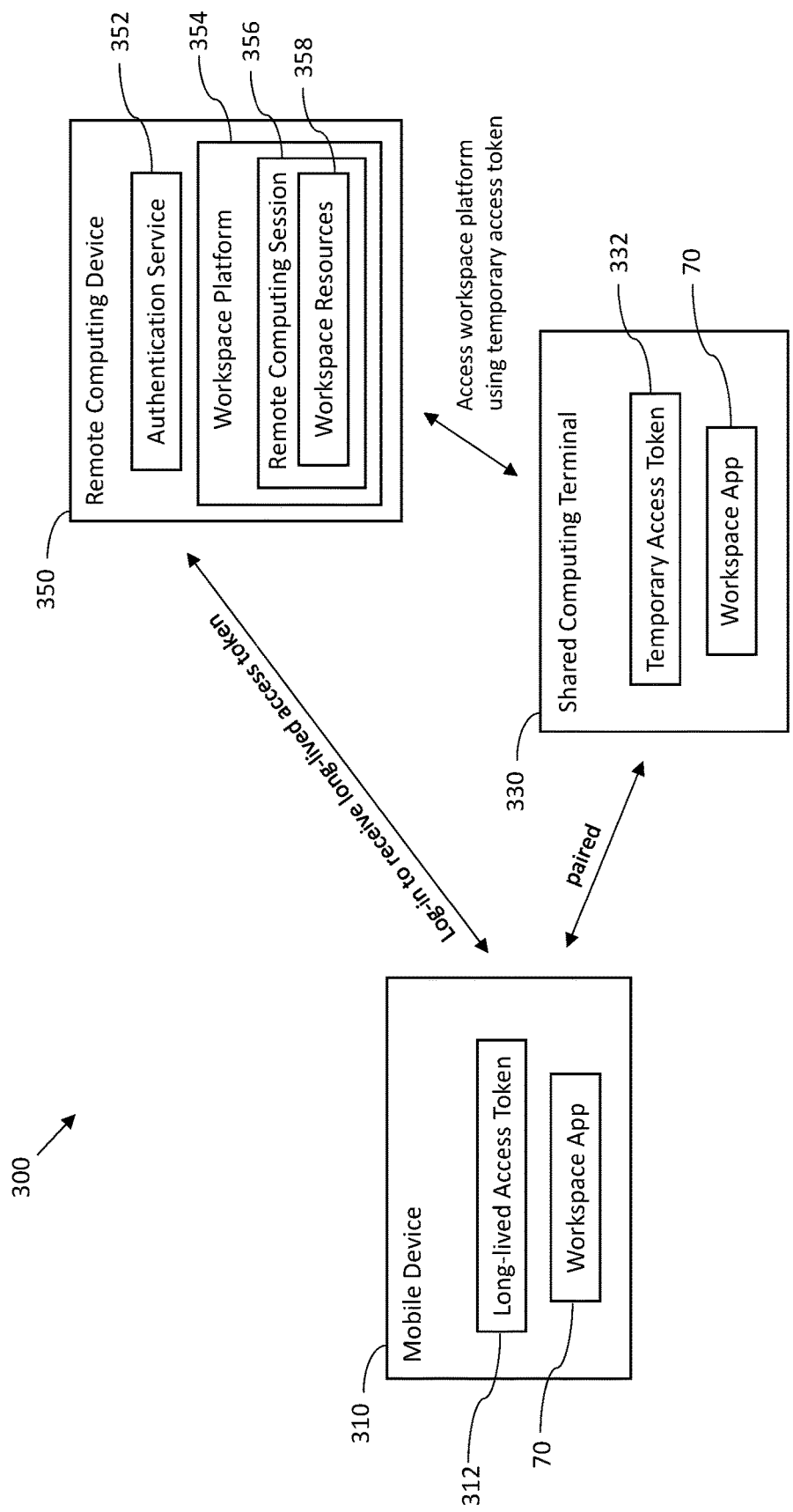
FIG. 6 is a schematic block diagram of a computing system that includes a shared computing terminal to access computing resources when paired with a mobile device according to aspects of the disclosure.

Referring now to FIG. 6, a computing system 300 that includes a shared computing terminal 330 accessing a remote computing device 350 via a remote computing session 356 when paired with a mobile device 310 will now be discussed. The remote computing device 350 includes a workspace platform 354 providing workspace resources 358 and an authentication service 352. The remote computing session 356 may be referred to as a session. The workspace resources 358 may be referred to as resources. The authentication service 352 may be referred to as a service.

As will be explained in greater detail below, the shared computing terminal 330 is able to directly access the remote computing session 356 provided by the remote computing device 350 when paired with the mobile device 310. The shared computing terminal 330 uses a temporary access token 332 that is given to the shared computing terminal 330 by the remote computing device 350 to access the workspace resources 358 that are available in the remote computing session 354.

The temporary access token 332 is given to the shared computing terminal 330 after authentication of the user of the mobile device 310. The authentication of the user of the mobile device 310 allows pairing of the mobile device 310 with the shared computing terminal 330 in order for the shared computing terminal 330 to access the remote computing session 356. The authentication ensures that the user of the mobile device 310 is the same user requesting the temporary access token 332.

The mobile device 310 initially logs into the workspace platform 354, and after authorization of the user by the authentication service 352, receives a long-lived access token 312. The long-lived access token 312 allows the user of the mobile device 310 to later log back into the workspace platform 354 without requiring further authentication. The time period for the long-lived access token 312 may be several days, weeks, months or longer, for example.

It is not desirable for the mobile device 310 to provide the long-lived access token 312 to the shared computing terminal 330 to directly access the workspace platform 354 since the shared computing terminal 330 is used by users other than the user of the mobile device 310. In short, the different users of the shared computing terminal 330 have access to the data stored on that machine. For instance, if the shared computing device 330 is a laptop with the long-lived access token 312, and the laptop is brought into proximity to the mobile device 310 to establish a communications channel with the mobile device 310, then the user of the laptop is able to access the remote computing session 356 belonging to the user of the mobile device 310.

It is also not desirable to have the user log into the shared computing terminal 330 each time the shared computing terminal 330 is to be used. The user of the mobile device 310 may be a doctor within a hospital, for example, and the doctor may use multiple shared computing terminals 330 throughout the day to access patient files. It is inconvenient for the doctor to do a full authorization to log into the shared computing terminal 330 each time the shared computing terminal 330 is needed.

After the mobile device 310 logs into the workspace platform 354 and receives the long-lived access token 312 from the authentication service 352, the mobile device 310 may remain connected to the remote computing session 356. If the user of the mobile device 310 wants to access their remote computing session 356 using the shared computing terminal 330, a communications channel is established between the mobile device 310 and the shared computing terminal 330.

The communications channel is established based on the mobile device 310 being in proximity to the shared computing terminal 330. The close proximity allows the mobile device 310 to be paired with the shared computing terminal 330. In one configuration, the mobile device 310 reads a QR code provided by the shared computing terminal 330. The QR code provides pairing information. Another configuration for the pairing is for the mobile device 310 to use near field communications (NFC) to exchange the pairing information with the shared computing terminal 330. The near field communications may be based on Bluetooth, which is a wireless technology that allows the exchange of data between different devices over short distances.

After establishing the communications channel, the mobile device 310 initiates authentication with the authentication service 352 to request the temporary access token 332. As part of the authentication, the mobile device 310 receives a challenge from the authentication service 352. The mobile device 310 signs the challenge and provides the long-lived access token 312 (previously received from the remote computing device 350) to the authentication service 352.

In response to authentication of the user of the mobile device 310 with the authentication service 352, the mobile device 310 receives a code from the authentication service 352. The code is configured to be effective for a single computing session, and to expire after a short time period. This time period may be several minutes, for example. The code confirms that the user of the mobile device 310 and the user of the shared computing terminal 330 are the same. Even if someone else were to intercept the code from the shared computing terminal 330 and provide to the authentication service 352 from a different device, the authentication service 352 would determine that the code is from an unknown device and reject it.

The mobile device 310 then provides the code to the shared computing terminal 330 via the communications channel to enable the shared computing terminal 330 to request the temporary access token 332 from the authentication service 352. The temporary access token 332 is advantageously used by the shared computing terminal 330 to launch a remote computing session 356 with the workspace platform 354 without transfer of the long-lived access token 312 from the mobile device 310 to the shared computing terminal 330.

The temporary access token 332 is effective for a single computing session, and/or is configured to expire after a set time period. The time period may be set by an administrator. In a hospital environment, the set time period may be 10 minutes, for example. If the set time period expires while the user is using the shared computing terminal 330, then the user will have to repeat the above steps for another temporary access token 332 to be received by the shared computing terminal 330.

The workspace app 70, as discussed above, is used by the mobile device 310 when accessing the workspace resources 358 provided by the workspace platform 354. The workspace app 70 may also be referred to as a local app or agent running on the mobile device 310. Without the local app or agent, the mobile device 310 is limited to the apps and desktops that are made available on the remote desktop received during the remote computing session 356.

With the local app or agent, the mobile device 310 has access to an embedded browser within the remote desktop for accessing SaaS and web apps. With the local app or agent, the mobile device 310 is also able to receive action workflows using microapps and receive published resources delivered by different resource feed that are available to the local app or agent. Since the shared computing terminal 330 is also using the same local app or agent, the shared computing terminal 330 accesses the same features and capabilities of the remote computing device 350 just like the mobile device 310.

Figure 7:
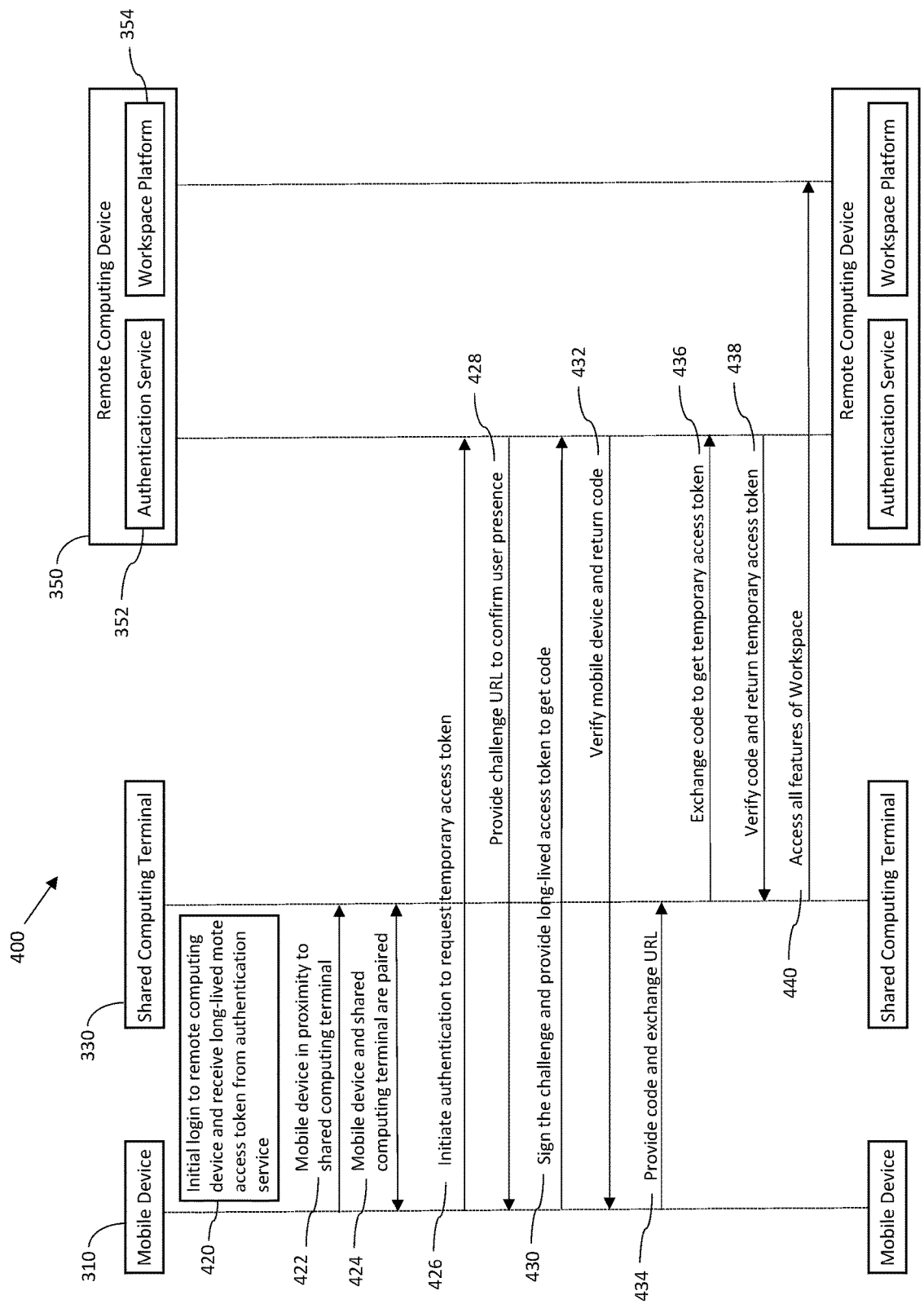
FIG. 7 is a sequence diagram on operating the computing system illustrated in FIG. 6.

Referring now to FIG. 7, a sequence diagram 400 on operating the computing system 300 will be discussed. The mobile device 310 initially logs into the remote computing device 350 at line 420, and receives the long-lived access token 312 from the authentication service 352. The mobile device 310 is now registered with the workspace platform 354.

For the user of the mobile device 310 to be able to use the shared computing terminal 330, a communications channel is to be established between the mobile device 310 and the shared computing terminal 330. The mobile device 310 is brought into close proximity to the shared computing terminal 330 at line 422 to establish the communications channel.

The mobile device 310 and the shared computing terminal 330 are paired at line 424. The pairing may be done using a QR code provided by the shared computing terminal 330 or by exchanging pairing information using near-field communications (NFC).

At line 426, the mobile device 310 initiates authentication with the service 352 in order to request a temporary access token 332 for the shared computing terminal 330. The authentication may be based OpenID Connect (OIDC), which is an authentication protocol that allows a user's identity to be verified when the user is trying to access a protected end point, such as the remote computing device 350.

The authentication service 352 provides a challenge URL back to the mobile device 310 at line 428 to confirm presence of the user of the mobile device 310. The challenge URL is the address of the authentication service 352 performing the authentication.

At line 430, the mobile device 310 signs the challenge and provides the long-lived access token 332 to the authentication service 352. The signing, in some examples, is a digital signature using a pair of keys that were generated when the mobile device 310 first registered with the remote computing device 350 at line 420. After authentication, the authentication service 352 generates a code that is to be provided to the shared computing terminal 330.

The mobile device 310 is verified at line 432 and the generated code is provided to the mobile device 310. The service 352 may also request multi-factor authentication (MFA) of the user of the mobile device 310, such as with biometrics, to ensure that the mobile device 310 is still available and someone did not steal the long-term access token 312 to make the request for the temporary access token 332.

At line 434, the mobile device 310 provides the code generated by the service 352 to the shared computing terminal 330 along with an exchange URL. The exchange URL is the same as the challenge URL in line 428, and provides the address of the service 352 performing the authentication.

The shared computing terminal 330 using the exchange URL provides the code to the authentication service 352 at line 436 in order for the code to be exchanged with the temporary access token 332. After verification of the code by the authentication service 352, the temporary access token 332 is provided to the shared computing terminal 330.

The shared computing terminal 330 is now able to present the temporary access token 332 to the remote computing device 350 in order to launch the remote computing session 356. Since the shared computing terminal 330 is using a local app or agent (e.g., the workspace app 70) to access the remote computing session 356, the shared computing terminal 330 accesses all the features and capabilities of the remote computing device 350.

Figure 8:
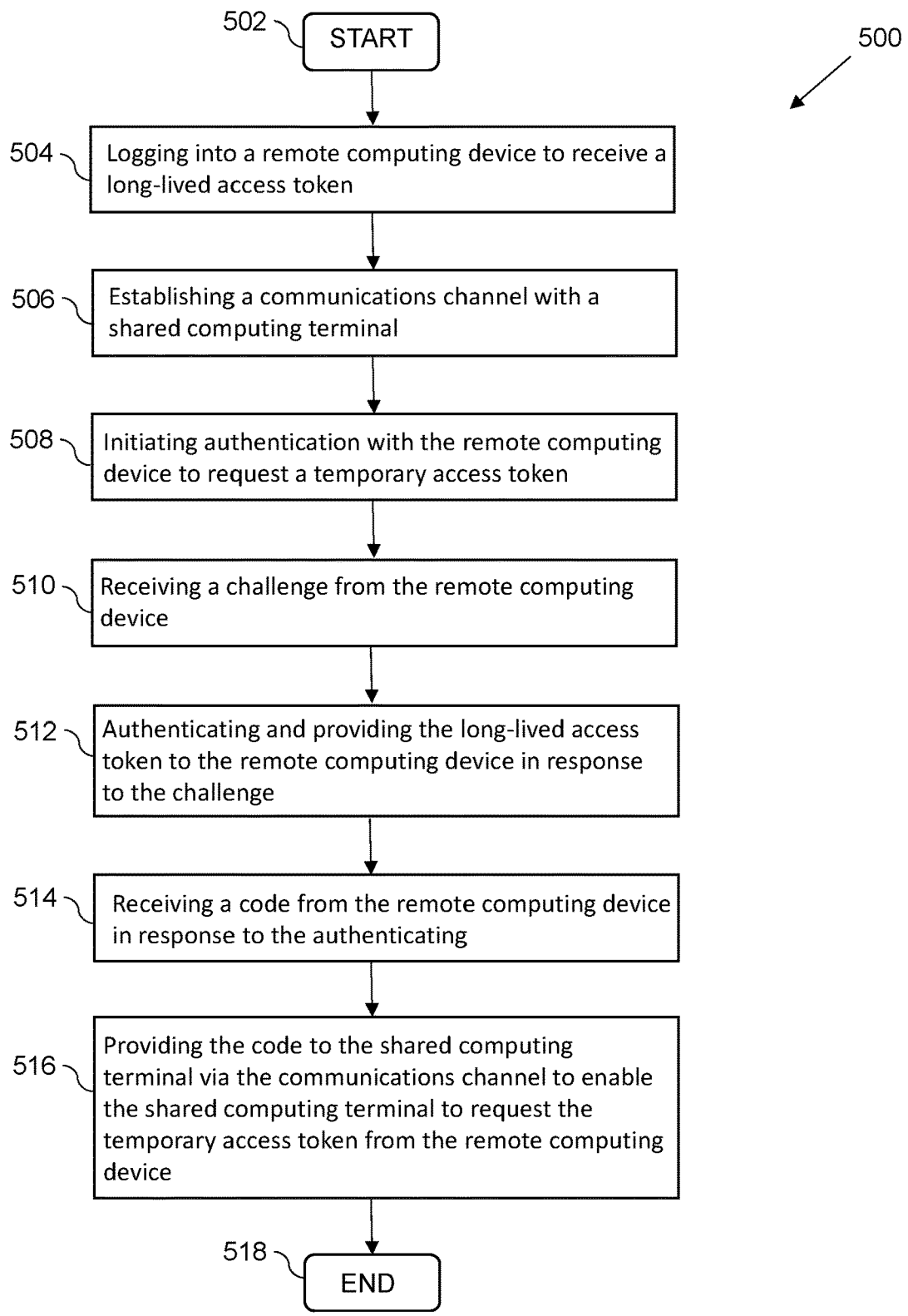
FIG. 8 is a flow diagram on operating the mobile device within the computing system illustrated in FIG. 6.

Referring now to FIG. 8, a flow diagram 500 from the perspective of the mobile device 310 operating within the computing device 300 will be discussed. From the start (Block 502), the user of the mobile device 310 logs into the remote computing device 350 to register with the workspace platform 354. As part of the registration, the mobile device 310 receives a long-lived access token 312 and is able to access the resources 358 made available by the remote computing device 350.

A communications channel is established at Block 506 with the shared computing terminal 330. When the mobile device 310 is in close proximity to the shared computing terminal 330, pairing is performed to establish the communications channel.

After the communications channel is established, the mobile device 310 initiates authentication with the remote computing device 350 at Block 508 to request a temporary access token 332 to be used by the shared computing terminal 330. The mobile device 310 receives a challenge from the remote computing device 350 at Block 510 in response to the initiated authentication.

The mobile device 310 signs the challenge at Block 512 and provides the long-lived access token 312 to the remote computing device 350. After authentication by the remote computing device 350, the mobile device 310 receives a code at Block 514 from the remote computing device 350. The mobile device 310 provides the code to the shared computing terminal 330 via the established communications channel at Block 516.

As noted above, the code is configured to be effective for a single computing session, and to expire after a short time period. This time period may be several minutes, for example. The code confirms that the user of the mobile device 310 and the user of the shared computing terminal 330 are the same. Even if someone else were to intercept the code from the shared computing terminal 330 and provide to the authentication service 352 from a different device, the authentication service 352 would determine that the code is from an unknown device and reject it. For example, this determination may be based on the mobile device 310 sharing details of the shared computing terminal 330 with the remote computing device 350. The sharing may occur when the mobile device 310 provides the long-lived access token 312 to the remote computing device 350 in order to receive the code that will be passed to the shared computing terminal 330. The details may include, for example, the IP address of the shared computing terminal 330 as determined by the mobile device 310 during the pairing. In response to the remote computing device 350 receiving the code, the remote computing device 350 compares the IP address of the shared computing terminal 330 as provided by the mobile device 310 to the IP address of the device providing the code. If the IP addresses do not match, then the remote computing device 350 does not provide the temporary access token 332 to the shared computing terminal 330.

The code enables the shared computing terminal 330 to request the temporary access token 332 from the remote computing device 350. The temporary access token 332 is used by the shared computing terminal 330 to launch a remote computing session 356 with the remote computing device 350 without transfer of the long-lived access token 312 from the mobile device 310 to the terminal 330. The method ends at Block 518.

Figure 9:
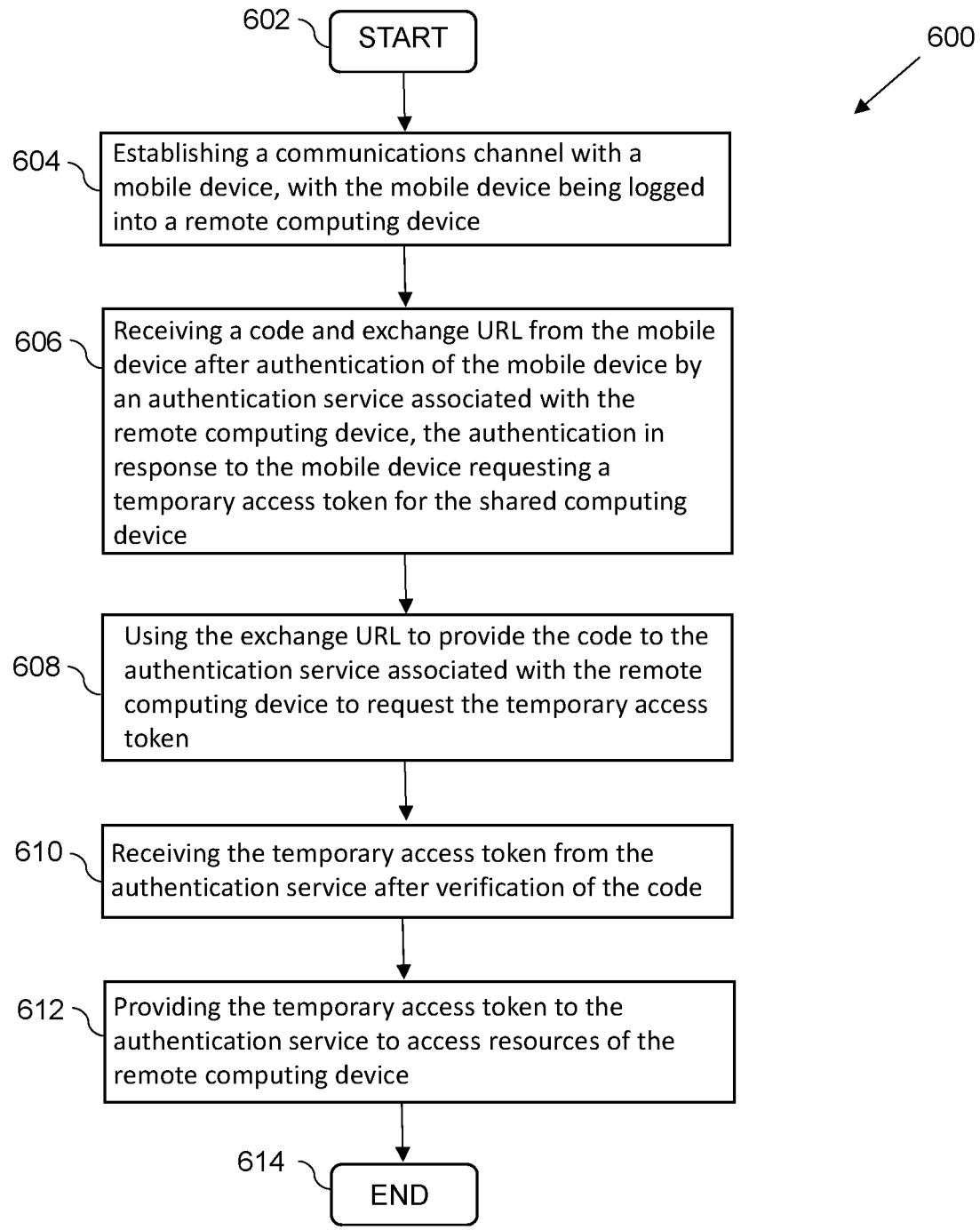
FIG. 9 is a flow diagram on operating the shared computing terminal within the computing system illustrated in FIG. 6.

Referring now to FIG. 9, a flow diagram 600 from the perspective of the shared computing terminal 330 operating within the computing system 300 will be discussed. From the start (Block 702), a communications channel is established with the mobile device 310 at Block 604. The mobile device 310 is logged into the remote computing device 350.

A code and exchange URL are received at Block 606 from the mobile device 310 after authentication of the mobile device 310 by an authentication service 352 associated with the remote computing device 350. The authentication is in response to the mobile device 310 requesting a temporary access token 332 for the shared computing device 330.

The exchange URL is used at Block 608 to provide the code to the authentication service 352 associated with the remote computing device 350 to request the temporary access token 332. The temporary access token 332 is received from the authentication service 352 at Block 610 after verification of the code. The temporary access token 332 is provided to the authentication service 352 at Block 612 to access resources 358 of the remote computing device 350. The method ends at Block 614.

Figure 10:
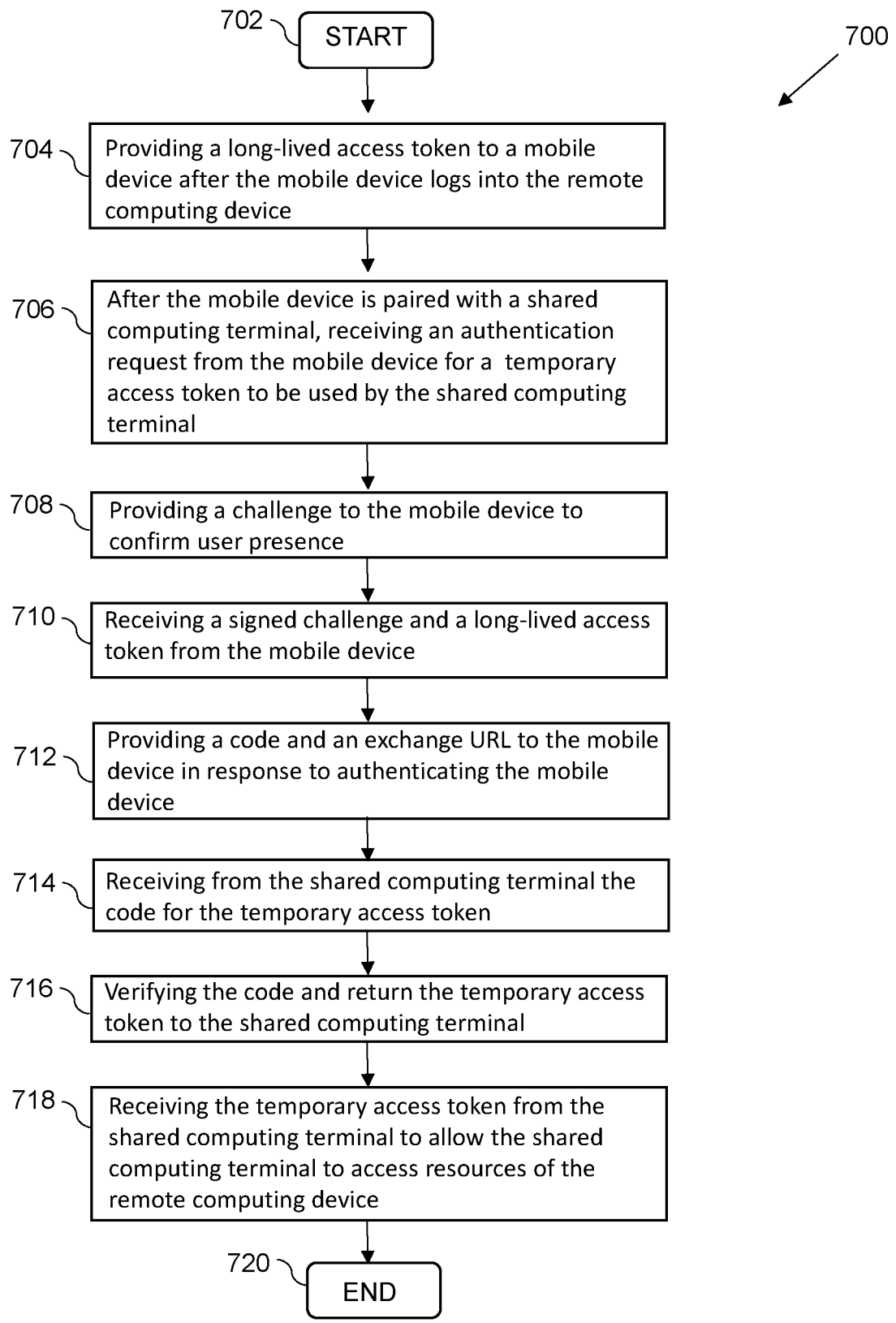
FIG. 10 is a flow diagram on operating the remote computing device within the computing system illustrated in FIG. 6.

Referring now to FIG. 10, a flow diagram 700 from the perspective of the remote computing device 350 operating within the computing system 300 will be discussed. From the start (Block 702), a long-lived access token 312 is provided to a mobile device 310 at Block 704 after the mobile device 310 logs into the remote computing device 350.

After the mobile device 310 is paired with a shared computing terminal 330 at Block 706, an authentication request is received from the mobile device 310 for a temporary access token 332 to be used by the shared computing terminal 330. A challenge is provided to the mobile device 310 to confirm user presence at Block 708.

A signed challenge and a long-lived access token 312 are received at Block 710 from the mobile device 310. A code and an exchange URL are provided to the mobile device 310 in response to authenticating the mobile device 310 at Block 712. The code for the temporary access token is received at Block 714 from the shared computing terminal 330.

The code is verified at Block 716 and the temporary access token 332 is returned to the shared computing terminal 330. The temporary access token 332 is received from the shared computing terminal 330 at Block 718 to allow the shared computing terminal 330 to access resources 358 of the remote computing device 330. The method ends at Block 720.

Example implementations of methods, computing devices and computer-readable media in accordance with the present disclosure will now be provided.

The following paragraphs (M1) through (M12) describe examples of methods that may be implemented in accordance with the present disclosure.

(M1) A method includes operating a mobile device to establish a communications channel between the mobile device and a shared computing terminal, with the shared computing terminal being accessible to a plurality of users other than a user of the mobile device. In response to authentication of the user of the mobile device with a remote computing device, a code is received from the remote computing device. The code is provided to the shared computing terminal via the communications channel to enable the shared computing terminal to request a temporary access token from the remote computing device. The temporary access token is used by the shared computing terminal to launch a computing session with the remote computing device without transfer of a long-lived access token of the user from the mobile device to the shared computing terminal.

(M2) A method as described in paragraph (M1), further includes operating the mobile device, after establishing the communications channel, to provide a request to the remote computing device for the temporary access token.

(M3) A method as described in any of paragraphs (M1) through (M2), wherein in response to the request for the temporary access token, the method may further include operating the mobile device to receive a challenge from the remote computing device, and provide a response to the challenge along with the long-lived access token to the remote computing device. The response and the long-lived access token are used by the remote computing device to authenticate the user of the mobile device.

(M4) A method as described in any of paragraphs (M1) through (M3), wherein providing the code to the shared computing terminal may further include providing an address of the remote computing device, with the remote computing device providing the temporary access token to the shared computing terminal in response to verification of the code provide by the shared computing terminal.

(M5) A method as described in any of paragraphs (M1) through (M4), wherein the long-lived access token allows the mobile device to access workspace resources via the remote computing device, and wherein the temporary access token allows the shared computing terminal to access the same workspace resources.

(M6) A method as described in any of paragraphs (M1) through (M5), wherein the code and the temporary access token may be configured to expire after a set time period.

(M7) A method as described in any of paragraphs (M1) through (M6), wherein the code and the temporary access token may be effective for a single computing session.

(M8) A method as described in any of paragraphs (M1) through (M7), wherein the method may further include operating the mobile device to log into the remote computing device based on an initial authentication of the user with the remote computing device, and receive the long-lived access token in response to the initial authentication.

(M9) A method as described in any of paragraphs (M1) through (M8), wherein the initial authentication of the user at login may be separate from the authentication of the user to receive the code.

(M10) A method as described in any of paragraphs (M1) through (M9), wherein the long-lived access token allows the user of the mobile device to later log back into the remote computing device without requiring authentication.

(M11) A method as described in any of paragraphs (M1) through (M10), wherein the communications channel is established based on the mobile device pairing with the shared computing terminal.

(M12) A method as described in any of paragraphs (M1) through (M11), wherein the pairing may be based on the mobile device reading a QR code provided by the shared computing terminal, with the QR code providing pairing information. Alternatively, the pairing may be based on the mobile device using near field communications (NFC) to exchange the pairing information with the shared computing terminal.

The following paragraphs (S1) through (S12) describe examples of mobile devices that may be implemented in accordance with the present disclosure.

(S1) A mobile device includes a memory and a processor configured to cooperate with the memory. The processor is configured to establish a communications channel between the mobile device and a shared computing terminal, with the shared computing terminal being accessible to a plurality of users other than a user of the mobile device. In response to authentication of the user of the mobile device with a remote computing device, a code is received from the remote computing device. The code is provided to the shared computing terminal via the communications channel to enable the shared computing terminal to request a temporary access token from the remote computing device. The temporary access token is used by the shared computing terminal to launch a computing session with the remote computing device without transfer of a long-lived access token of the user from the mobile device to the shared computing terminal.

(S2) A mobile device as described in paragraph (S1), wherein the processor is further configured, after establishing the communications channel, to provide a request to the remote computing device for the temporary access token.

(S3) A mobile device as described in any of paragraphs (S1) through (S2), wherein in response to the request for the temporary access token, the processor may further receive a challenge from the remote computing device, and provide a response to the challenge along with the long-lived access token to the remote computing device. The response and the long-lived access token are used by the remote computing device to authenticate the user of the mobile device.

(S4) A mobile device as described in any of paragraphs (S1) through (S3), wherein providing the code to the shared computing terminal may further include the processor providing an address of the remote computing device, with the remote computing device providing the temporary access token to the shared computing terminal in response to verification of the code provide by the shared computing terminal.

(S5) A mobile device as described in any of paragraphs (S1) through (S4), wherein the long-lived access token allows the mobile device to access workspace resources via the remote computing device, and wherein the temporary access token allows the shared computing terminal to access the same workspace resources.

(S6) A mobile device as described in any of paragraphs (S1) through (S5), wherein the code and the temporary access token may be configured to expire after a set time period.

(S7) A mobile device as described in any of paragraphs (S1) through (S6), wherein the code and the temporary access token may be effective for a single computing session.

(S8) A mobile device as described in any of paragraphs (S1) through (S7), wherein the processor may be further configured to log into the remote computing device based on an initial authentication of the user with the remote computing device, and receive the long-lived access token in response to the initial authentication.

(S9) A mobile device as described in any of paragraphs (S1) through (S8), wherein the initial authentication of the user at login may be separate from the authentication of the user to receive the code.

(S10) A mobile device as described in any of paragraphs (S1) through (S9), wherein the long-lived access token allows the user of the mobile device to later log back into the remote computing device without requiring authentication.

(S11) A mobile device as described in any of paragraphs (S1) through (S10), wherein the communications channel is established based on the processor pairing with the shared computing terminal.

(S12) A mobile device as described in any of paragraphs (S1) through (S11), wherein the pairing may be based on the processor reading a QR code provided by the shared computing terminal, with the QR code providing pairing information. Alternatively, the pairing may be based on the processor using near field communications (NFC) to exchange the pairing information with the shared computing terminal.

The following paragraphs (CRM1) through (CRM12) describe examples of computer-readable media that may be implemented in accordance with the present disclosure.

(CRM1) A computer-readable medium for a computing device includes a plurality of computer executable instructions which, when executed, causes the mobile device to establish a communications channel between the mobile device and a shared computing terminal, with the shared computing terminal being accessible to a plurality of users other than a user of the mobile device. In response to authentication of the user of the mobile device with a remote computing device, a code is received from the remote computing device. The code is provided to the shared computing terminal via the communications channel to enable the shared computing terminal to request a temporary access token from the remote computing device. The temporary access token is used by the shared computing terminal to launch a computing session with the remote computing device without transfer of a long-lived access token of the user from the mobile device to the shared computing terminal.

(CRM2) A computer-readable medium as described in paragraph (CRM1), further includes operating the mobile device, after establishing the communications channel, to provide a request to the remote computing device for the temporary access token.

(CRM3) A computer-readable medium as described in any of paragraphs (CRM1) through (CRM2), wherein in response to the request for the temporary access token, the mobile device may be further operated to receive a challenge from the remote computing device, and provide a response to the challenge along with the long-lived access token to the remote computing device. The response and the long-lived access token are used by the remote computing device to authenticate the user of the mobile device.

(CRM4) A computer-readable medium as described in any of paragraphs (CRM1) through (CRM3), wherein providing the code to the shared computing terminal may further include providing an address of the remote computing device, with the remote computing device providing the temporary access token to the shared computing terminal in response to verification of the code provide by the shared computing terminal.

(CRM5) A computer-readable medium as described in any of paragraphs (CRM1) through (CRM4), wherein the long-lived access token allows the mobile device to access workspace resources via the remote computing device, and wherein the temporary access token allows the shared computing terminal to access the same workspace resources.

(CRM6) A computer-readable medium as described in any of paragraphs (CRM1) through (CRM5), wherein the code and the temporary access token may be configured to expire after a set time period.

(CRM7) A computer-readable medium as described in any of paragraphs (CRM1) through (CRM6), wherein the code and the temporary access token may be effective for a single computing session.

(CRM8) A computer-readable medium as described in any of paragraphs (CRM1) through (CRM7), wherein the mobile device may be further operated to log into the remote computing device based on an initial authentication of the user with the remote computing device, and receive the long-lived access token in response to the initial authentication.

(CRM9) A computer-readable medium as described in any of paragraphs (CRM1) through (CRM8), wherein the initial authentication of the user at login may be separate from the authentication of the user to receive the code.

(CRM10) A computer-readable medium as described in any of paragraphs (CRM1) through (CRM9), wherein the long-lived access token allows the user of the mobile device to later log back into the remote computing device without requiring authentication.

(CRM11) A computer-readable medium as described in any of paragraphs (CRM1) through (CRM10), wherein the communications channel is established based on the mobile device pairing with the shared computing terminal.

(CRM12) A computer-readable medium as described in any of paragraphs (CRM1) through (CRM11), wherein the pairing may be based on the mobile device reading a QR code provided by the shared computing terminal, with the QR code providing pairing information. Alternatively, the pairing may be based on the mobile device using near field communications (NFC) to exchange the pairing information with the shared computing terminal.

As will be appreciated by one of skill in the art upon reading the above disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A method comprising:
operating a mobile device to perform the following:
establishing a communications channel between the mobile device and a shared computing terminal, with the shared computing terminal being accessible to a plurality of users other than a user of the mobile device,
in response to authentication of the user of the mobile device with a remote computing device, receiving a code from the remote computing device,
providing the code to the shared computing terminal via the communications channel to enable the shared computing terminal to request a temporary access token from the remote computing device, with the temporary access token being used by the shared computing terminal to launch a computing session with the remote computing device without transfer of a long-lived access token of the user from the mobile device to the shared computing terminal,
receiving a challenge from the remote computing device in response to the request for the temporary access token, and
providing a challenge response to the challenge along with the long-lived access token to the remote computing device, with the challenge response and the long-lived access token being used by the remote computing device to authenticate the user of the mobile device.

2. The method according to claim 1 wherein providing the code to the shared computing terminal further comprises providing an address of the remote computing device, with the remote computing device providing the temporary access token to the shared computing terminal in response to verification of the code provide by the shared computing terminal.

3. The method according to claim 1 wherein the long-lived access token allows the mobile device to access workspace resources via the remote computing device, and wherein the temporary access token allows the shared computing terminal to access the same workspace resources.

4. The method according to claim 1 wherein the code and the temporary access token are configured to expire after a set time period.

5. The method according to claim 1 wherein the code and the temporary access token are effective for a single computing session.

6. The method according to claim 1 further comprising operating the mobile device to perform the following:
logging into the remote computing device based on an initial authentication of the user with the remote computing device; and
receiving the long-lived access token in response to the initial authentication.

7. The method according to claim 6 wherein the initial authentication of the user at login is separate from the authentication of the user to receive the code.

8. The method according to claim 6 wherein the long-lived access token allows the user of the mobile device to later log back into the remote computing device without requiring authentication.

9. The method according to claim 1 wherein the communications channel is established based on the mobile device pairing with the shared computing terminal.

10. The method according to claim 9 wherein the pairing is based on the mobile device performing at least one of the following:

reading a QR code provided by the shared computing terminal, with the QR code providing pairing information; and using near field communications (NFC) to exchange the pairing information with the shared computing terminal.

11. A mobile device comprising:

a memory and a processor configured to cooperate with said memory to perform the following:

establish a communications channel with a shared computing terminal, with the shared computing terminal being accessible to a plurality of users other than a user of the mobile device, in response to authentication of the user of the mobile device with a remote computing device, receive a code from the remote computing device, provide the code to the shared computing terminal via the communications channel to enable the shared computing terminal to request a temporary access token from the remote computing device, with the temporary access token being used by the shared computing terminal to launch a computing session with the remote computing device without transfer of a long-lived access token of the user from the mobile device to the shared computing terminal, receive a challenge from the remote computing device in response to the request for the temporary access token, and provide a challenge response to the challenge along with the long-lived access token to the remote computing device, with the challenge response and the long-lived access token being used by the remote computing device to authenticate the user of the mobile device.

12. The mobile device according to claim 11 wherein the long-lived access token allows said processor to access workspace resources via the remote computing device, and wherein the temporary access token allows the shared computing terminal to access the same workspace resources.

13. The mobile device according to claim 11 wherein the code and the temporary access token are effective for a single computing session.

14. The mobile device according to claim 11 wherein said processor is further configured to perform the following:

log into the remote computing device based on an initial authentication of the user with the remote computing device; and receive the long-lived access token in response to the initial authentication.

15. The mobile device method according to claim 14 wherein the initial authentication of the user at login is separate from the authentication of the user to receive the code.

16. A non-transitory computer readable medium for a mobile device, and with the non-transitory computer readable medium having a plurality of computer executable instructions for causing the mobile device to perform steps comprising:

establishing a communications channel between the mobile device and a shared computing terminal, with the shared computing terminal being accessible to a plurality of users other than a user of the mobile device;

in response to authentication of the user of the mobile device with a remote computing device, receiving a code from the remote computing device;

providing the code to the shared computing terminal via the communications channel to enable the shared computing terminal to request a temporary access token from the remote computing device, with the temporary access token being used by the shared computing terminal to launch a computing session with the remote computing device without transfer of a long-lived access token of the user from the mobile device to the shared computing terminal;

receiving a challenge from the remote computing device in response to the request for the temporary access token; and providing a challenge response to the challenge along with the long-lived access token to the remote computing device, with the challenge response and the long-lived access token being used by the remote computing device to authenticate the user of the mobile device.

\* \* \* \* \*